United States Patent
Yoshinaga

(10) Patent No.: US 10,358,295 B2
(45) Date of Patent: Jul. 23, 2019

(54) TRANSPORT DEVICE

(71) Applicant: Daifuku Co., Ltd., Osaka-shi (JP)

(72) Inventor: Kazuharu Yoshinaga, Hinocho (JP)

(73) Assignee: Daifuku Co., Ltd., Osaka-shi (JP)

( * ) Notice: Subject to any disclaimer, the term of this patent is extended or adjusted under 35 U.S.C. 154(b) by 0 days.

(21) Appl. No.: 15/982,030

(22) Filed: May 17, 2018

(65) Prior Publication Data
US 2018/0334330 A1  Nov. 22, 2018

(30) Foreign Application Priority Data
May 18, 2017  (JP) .................................. 2017-099143

(51) Int. Cl.
| | | |
|---|---|---|
| B65G 21/00 | (2006.01) | |
| B65G 21/20 | (2006.01) | |
| B65G 1/02 | (2006.01) | |
| B65G 1/04 | (2006.01) | |

(52) U.S. Cl.
CPC ......... B65G 21/2072 (2013.01); B65G 1/023 (2013.01); B65G 1/0485 (2013.01); B65G 21/2054 (2013.01); *B65G 2201/0235* (2013.01)

(58) Field of Classification Search
None
See application file for complete search history.

(56) References Cited

U.S. PATENT DOCUMENTS

| | | | | |
|---|---|---|---|---|
| 4,311,266 A | * | 1/1982 | Kondo | ............... H05K 13/0061 134/83 |
| 6,471,050 B2 | * | 10/2002 | Ikeda | ..................... B65G 43/08 198/345.1 |

FOREIGN PATENT DOCUMENTS

JP    2003192105 A    7/2003

* cited by examiner

*Primary Examiner* — Kavel Singh
(74) *Attorney, Agent, or Firm* — The Webb Law Firm

(57) ABSTRACT

A transport device includes a conveyor, a plurality of movable guide rails each of which is provided at a corresponding one of a plurality of locations along a lateral width direction, a drive shaft disposed to extend along the lateral width direction, and an actuator configured to drivingly rotate the drive shaft. A plurality of cam members are fixed to the drive shaft in respective fixing attitudes. Each movable guide rail of a plurality of movable guide rails is configured to be moved to change a height thereof depending on a fixing attitude of corresponding one of the cam members as the actuator drivingly rotates the drive shaft.

11 Claims, 9 Drawing Sheets

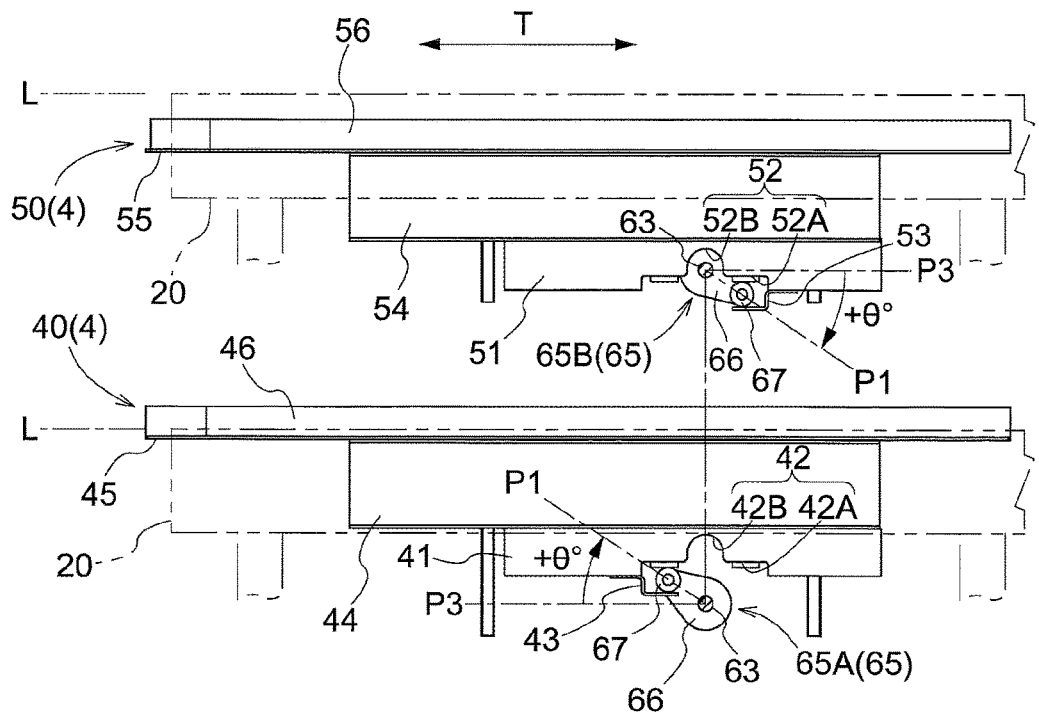
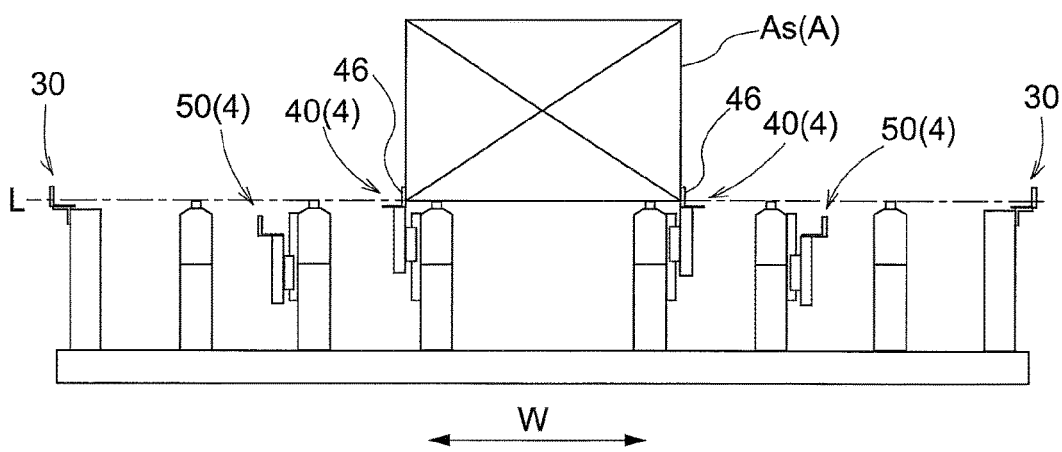

TRANSPORT DEVICE

CROSS-REFERENCE TO RELATED APPLICATION

This application claims priority to Japanese Patent Application No. 2017-099143 filed May 18, 2017, the disclosure of which is hereby incorporated in its entirety by reference.

FIELD OF THE INVENTION

The present invention relates to a transport device.

BACKGROUND ART

In order to take articles into and out of an article storage facility in cooperation with, for example, a stacker crane, a transport device is utilized which includes a conveyor for transporting a transported object along a transport direction, and a plurality of movable guide rails provided at a plurality of locations along the lateral width direction. For example, JP Publication of Application No. 2003-192105 (Patent Document 1) discloses a transport device (carrying-in-or-out conveyor device 1) which includes a pair of conveyors (chain-conveyor devices 1), a pair of movable guide rails (movable guides 13) which can be vertically moved, and a pair of fixed guide rails (fixed guides 12), with one movable guide rail as well as one fixed guide rail located on each side of the pair of conveyors. When transporting a transported object having a large width, the movable guide rails are lowered and the transported object is guided by the pair of fixed guide rails whereas, when transporting a transported object having a small width, the movable guide rails are raised and the transported object is guided by the pair of movable guide rails.

In the transport device of Patent Document 1, a separate raising-and-lowering mechanism is independently provided for each pair of movable guide rails to raise and lower the movable guide rails. Therefore, a relatively large number of actuators are required, which lead to an increase in size and cost of the transport device. Especially when the number of movable guide rails needs to be increased to handle transported objects of various sizes, the number of necessary actuators also increases as the number of the movable guide rails increases, which makes the problem described above worse.

SUMMARY OF THE INVENTION

It is desirable to reduce the size and cost of a transport device that includes a plurality of movable guide rails which can be raised and lowered.

A transport device of the present disclosure comprises: a conveyor configured to transport a transported object along a transport direction; a plurality of movable guide rails each of which is provided at a corresponding one of a plurality of locations along a lateral width direction which is perpendicular to the transport direction, such that each of the plurality of movable guide rails extends along the transport direction; a drive shaft disposed to extend along the lateral width direction; an actuator configured to drivingly rotate the drive shaft; wherein a plurality of cam members are fixed to the drive shaft, in respective fixing attitudes, such that each of the plurality of cam members is provided for corresponding one of the plurality of movable guide rails, wherein each of the plurality of movable guide rails is configured to be moved to change a height thereof depending on a fixing attitude of corresponding one of the cam members as the actuator drivingly rotates the drive shaft.

With such an arrangement, when the actuator drivingly rotates the drive shaft to which the plurality of cam members are fixed, each of the plurality of movable guide rails is moved to change its height depending on a fixing attitude of corresponding one of the cam members. Because a single actuator is used for changing the heights of the plurality of movable guide rails, only one actuator is required, which makes it possible to reduce the size and cost of the transport device. Even when the number of movable guide rails installed is increased to more than two in particular, such situation may be dealt with by increasing the number of the cam members fixed to the drive shaft, without having to increase the number of actuators. Thus, transporting of transported objects of various sizes can be properly guided while making it possible to reduce the size and cost of the transport device.

Additional features and advantages of the technology related to the present disclosure will be made clear by the following description of various non-limiting example embodiments of the present disclosure described with reference to the attached drawings.

BRIEF DESCRIPTION OF THE DRAWINGS

FIG. 5 is a side view showing the states of two movable guide rails when a drive shaft is at a first phase angle, FIG. 6 is a front view of the transport device when the drive shaft is at the first phase angle.

DETAILED DESCRIPTION OF EMBODIMENTS

Embodiments of a transport device are described next with reference to the attached drawings. The transport device 1 is used in an article storage facility to work with, for example, a stacker crane to carry articles into and out of the article storage facility. The transport device 1 of the present embodiment is a carriage-type transport device in which conveyors 20 are provided on a carriage configured to travel along a travel path.

Figure 1:
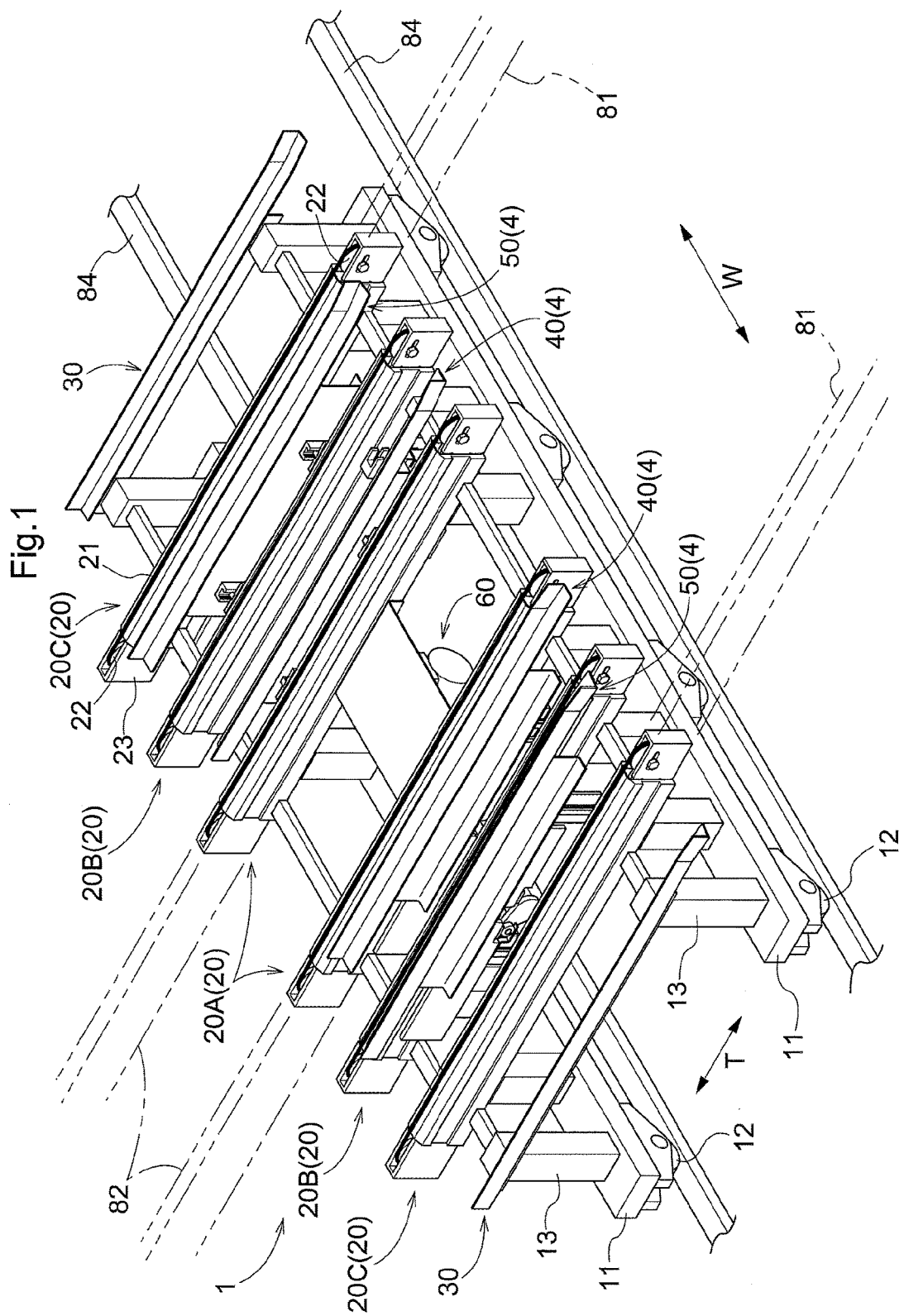
FIG. 1 is a perspective view showing an entire transport device.

As shown in FIG. 1, installed in the article storage facility are a carrying-in-side conveyor device 81 and a carrying-out-side conveyor device 82 each of which extends along (i.e., parallel to) a transport direction T defined in advance. The carrying-in-side conveyor device 81 and the carrying-out-side conveyor device 82 are so located to be spaced apart from each other by a predetermined distance along the transport direction T. A pair of travel rails 84 are installed on a portion of a floor surface that is located between the carrying-in-side conveyor device 81 and the carrying-out-side conveyor device 82 along the transport direction T such that the travel rails 84 extend along a lateral width direction W which is perpendicular to the transport direction T. The travel rails 84 may extend linearly or may form a closed loop.

Note that, while not shown, in order to allow transported objects A of different sizes to be transported, a plurality of carrying-in-side conveyor devices 81 having different dimensions and a plurality of carrying-out-side conveyor devices 82 having different dimensions are installed in the article storage facility such that the carrying-in-side conveyor devices 81 are spaced apart from each other along the lateral width direction W and the carrying-out-side conveyor devices 82 are spaced apart from each other along the lateral width direction W. The transport device 1 receives a transported object A of a predetermined size from one of the plurality of carrying-in-side conveyor devices 81, moves along the travel rails 84 to the location of one of the plurality of carrying-out-side conveyor devices 82, and transfers the transported object A to that carrying-out-side conveyor device 82. As such, the transport device 1 of the present embodiment is a carriage-type transport device on a railed track.

The transport device 1 includes lower frame members 11, a plurality of wheels 12 rotatably attached to these lower frame members 11, and a plurality of support columns 13. Each wheel 12 is rotatably attached to the bottom surface of a lower frame member 11, and rolls on a travel rail 84. The transport device 1 travels on the travel rails 84 along the lateral width direction W as a result of at least one of the plurality of wheels 12 being driven and rotated by a drive motor (e.g., an electric motor). The support columns 13 are fixed to the top surfaces of the lower frame members 11 and support the conveyors 20 and fixed guide rails 30 which are components of the transport device 1. In addition, the support columns 13 also support, through the conveyors 20, movable guide rails 4 which are connected to corresponding conveyors 20.

Figure 2:
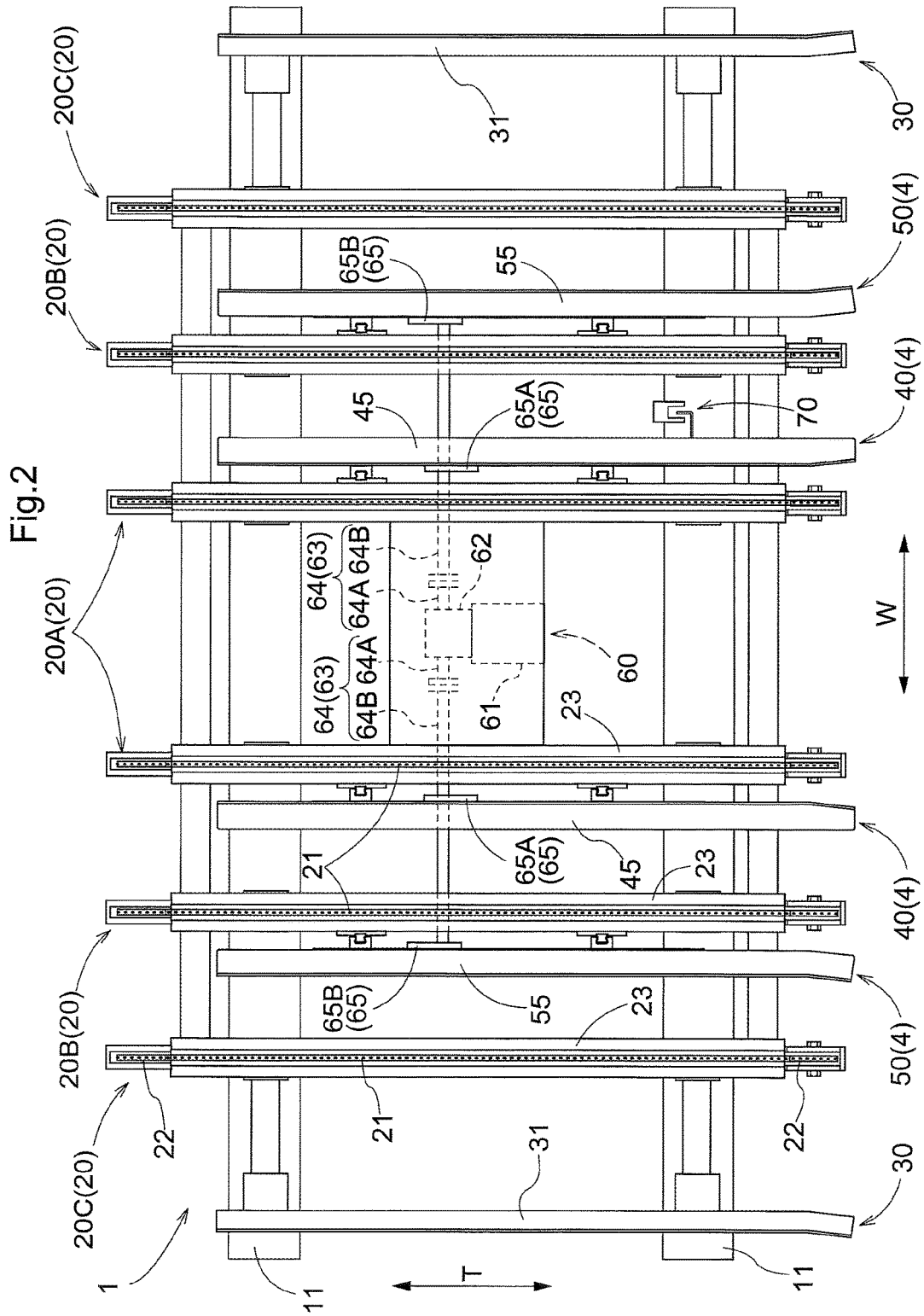
FIG. 2 is a plan view of the transport device.
Figure 3:
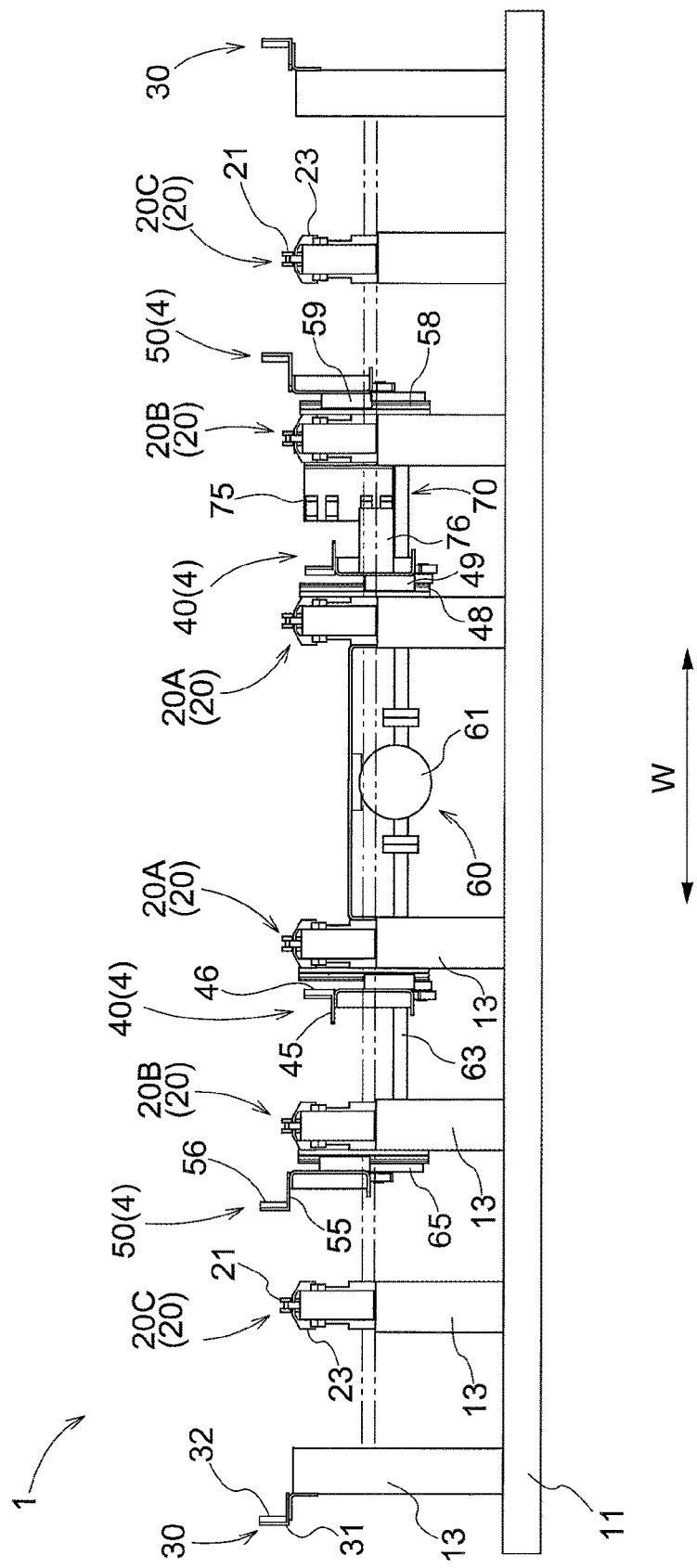
FIG. 3 is a front view of the transport device.

As shown in FIGS. 2 and 3, the transport device 1 includes the conveyors 20, the fixed guide rails 30, the movable guide rails 4, and a raising-and-lowering mechanism 60, as its principal components. In addition, the transport device 1 includes a raising-and-lowering-state detector 70.

The conveyor 20 transports a transported object A along the transport direction T. The transport device 1 includes a plurality of conveyors 20 (six conveyors 20 in the present embodiment). These plurality of conveyors 20 are located at a plurality of locations such that they are spaced apart from each other along the lateral width direction W and extend parallel to each other. The conveyors 20 include a pair of first conveyors 20A, a pair of second conveyors 20B, and a pair of third conveyors 20C. The pair of first conveyors 20A are installed to be spaced apart from each other by a predetermined distance. The pair of second conveyors 20B are installed to be spaced apart from each other by a predetermined distance such that one second conveyor 20B of the pair is located on each exterior side of (i.e., side opposite from the space between) the pair of first conveyors 20A. The pair of third conveyors 20C are installed to be spaced apart from each other by a predetermined distance such that one third conveyor 20C of the pair is located on each (exterior) side of the pair of second conveyors 20B.

Each conveyor 20 is a chain conveyor which has a chain 21 (see also FIG. 1), in the present embodiment. Each conveyor 20 has a covering 23 which extends along the transport direction T, a pair of sprockets 22 each axially supported (i.e., supported for rotation about an axis) at a corresponding end portion of this covering 23, and a chain 21 which runs over and extends between the pair of sprockets 22. Each covering 23 is supported from below by support columns 13. The sprockets 22 located at the one end portions (of the conveyors 20) on the same side along the transport direction T are connected, or coupled, to a transport-purpose motor (an electric motor used for transporting operations) through one or more power transmission shafts (not shown). The conveyors 20 can transport a transported object A supported on the chains 21 in one direction and the other and opposite direction along the transport direction T when the transport-purpose motor rotates in a forward direction and backward direction. In addition, the height or the elevation of the top surface of a chain 21 is a height (supporting level) at which a transported object A is supported. In the following description, this height will be referred to as a "support height L" for the transported object A (see, for example, FIG. 6).

A transported object A may be a support member (such as a pallet or a skid, for example) alone, or such a support member with one or more articles or items placed on the support member. Alternatively, a transported object A may be a container (such as a case, cage, or basket, for example) alone, or such a container with one or more articles or items held in the container, among other possibilities.

Each fixed guide rail 30 is one of the members for guiding the transporting of a transported object A, and is fixed at a selected location. Each fixed guide rail 30 is fixed to support columns 13 through one or more fixing members, and is supported from below by support columns 13. The transport device 1 includes a pair of fixed guide rails 30. The pair of fixed guide rails 30 are so located that one and the other fixed guide rails 30 of the pair are located on one exterior side and the other exterior side respectively, along the lateral width direction W, of the plurality of conveyors 20 such that each fixed guide rail 30 extends along the transport direction T. In addition, the pair of fixed guide rails 30 are so located that one and the other fixed guide rails 30 of the pair are located on one side and the other side respectively, along the lateral width direction W, of the plurality of movable guide rails 4 such that each fixed guide rail 30 extends along the transport direction T.

Each fixed guide rail 30 includes an angle member 31 having a L-shaped cross-section. Each fixed guide rail 30 (angle member 31) has a guide plate portion 32 extending along the transport direction T and along the vertical direction. The guide plate portion 32 is located such that at least a portion of it is located above (i.e. at a greater height than) the support height L for the transported object A. The guide plate portions 32 of the pair of fixed guide rails 30 guide the transporting of a transported object A having a large width (referred to hereinafter as a "large-width transported object AL"), with the guide plate portions' surfaces that face each other (see FIG. 10).

Each movable guide rail 4 is one of the members for guiding the transporting of a transported object A, and provided at a selected location along the lateral width direction W such that it can be raised and lowered and thus can be moved to change its height (more preferably, moved along a vertical direction). Each movable guide rail 4 is supported from below by the raising-and-lowering mechanism 60, and is supported by a covering 23 of a conveyor 20 which is supported by support columns 13 such that the movable guide rail 4 can be raised and lowered and thus can be moved to change its height. The transport device 1 includes a plurality of movable guide rails 4. Each of the plurality of movable guide rails 4 is located at a corresponding one of a plurality of (i.e., the same number of) locations along the lateral width direction W such that each of the plurality of movable guide rails 4 extends along (i.e. parallel to) the transport direction T.

In the present embodiment, two pairs of movable guide rails 4 are provided to the transport device 1. That is, the transport device 1 includes a pair of first movable guide rails 40 and a pair of second movable guide rails 50, as the plurality of movable guide rails 4. The pair of second movable guide rails 50 are located to be spaced apart from each other by a predetermined distance such that one second movable guide rail 50 of the pair is located on each exterior side of (i.e., side opposite from the space between) the pair of first movable guide rails 40 along the lateral width direction W. More specifically, each first movable guide rail 40 is supported by, and on one exterior side of, the corresponding first conveyor 20A of the pair of the first conveyors 20A whereas each second movable guide rail 50 is supported by, on one exterior side of, the corresponding second conveyor 20B of the pair of the second conveyors 20B.

The pair of first movable guide rails 40 are raised and lowered, thus moved to change their height, in synchronization. The pair of second movable guide rails 50 are raised and lowered, thus moved to change their height, in synchronization but at a different timing from the raising and lowering of the first movable guide rails 40. Both the first movable guide rails 40 and the second movable guide rails 50 can be moved to a raised position, a lowered position, and an intermediate position. The raising and lowering of the first movable guide rails 40 and the second movable guide rails 50 are controlled by the raising-and-lowering mechanism 60. This will be described below in more detail.

Figure 4:
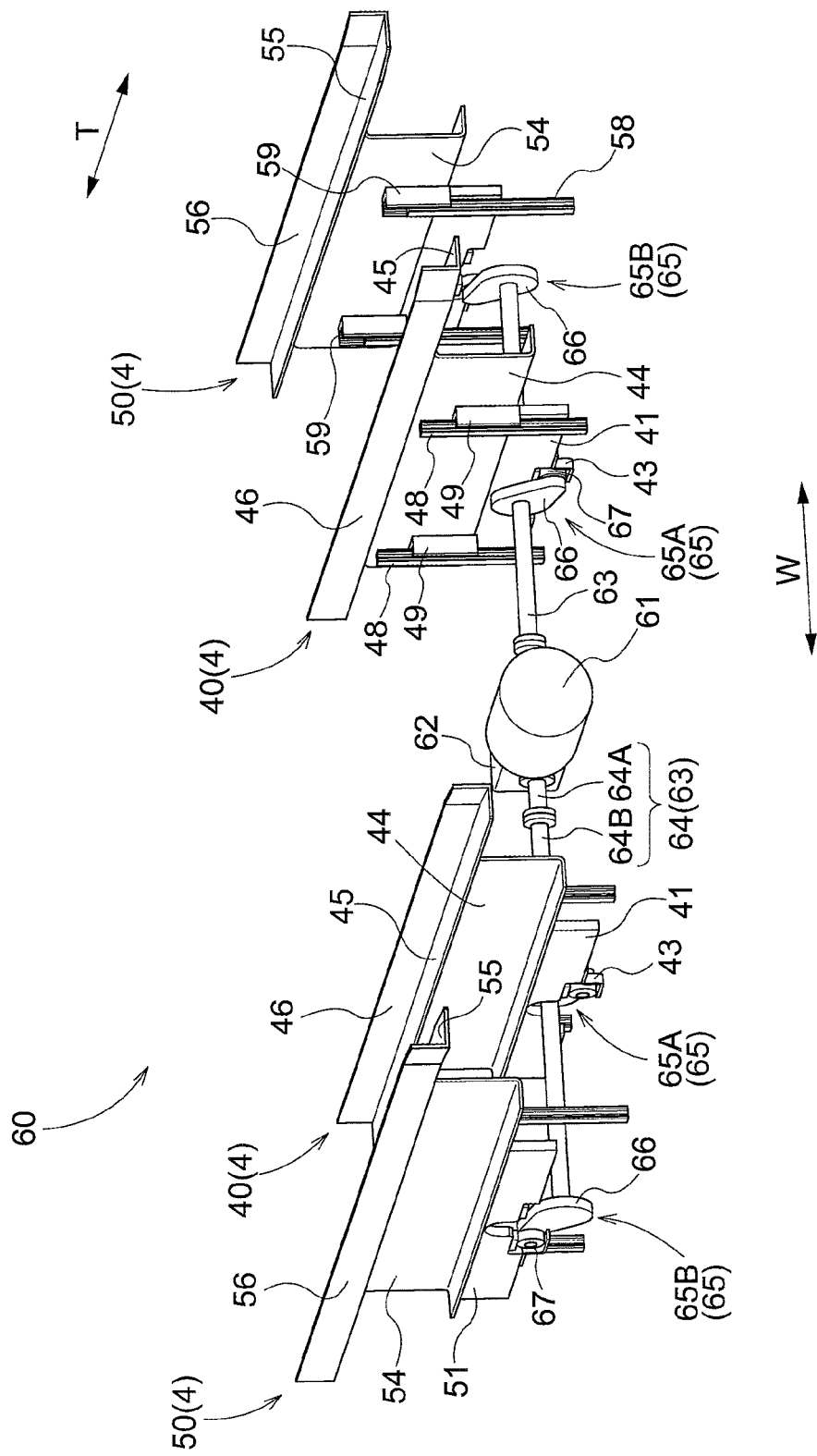
FIG. 4 is a perspective view of a raising-and-lowering mechanism.

As shown in FIGS. 3 and 4, each first movable guide rail 40 has a support plate portion 41, a connecting member 44 fixed to an upper portion of this support plate portion 41, and an L-shaped angle member 45 ("angle" as in an angle bar). Slidable members 49 are fixed to a side surface of the connecting member 44. Each slidable member 49 is engaged with a corresponding raising-and-lowering movement guide 48 fixed to the side surface of the covering 23 of a first conveyor 20A and can slide up and down the guide 48 while engaged therewith. Each first movable guide rail 40 is raised and lowered while being guided by the raising-and-lowering movement guide 48 and the slidable member 49 that are engaged with each other.

A cutout portion 42 which opens downward is formed in a lower end edge of each support plate portion 41 (see FIG. 5). Each cutout portion 42 is a combination of a generally rectangular-shape cutout portion 42A which has a flat rectangular shape as seen along a direction normal to the support plate portion 41 and an U-shape cutout portion 42B which is formed in the central portion of the rectangular-shape cutout portion 42A and which has an inverted U-shape as seen along a direction normal to the support plate portion 41. In addition, a locking plate 43 is fixed to a bottom surface of the support plate portion 41 such that the locking plate 43 is located across from the cutout portion 42 (rectangular-shape cutout portion 42A in the present example). The locking plate 43 is a bent plate which is a piece of elongate flat thin material bent into a crank shape (i.e. bent to form a right angle at two longitudinally intermediate locations so that the two end pieces are parallel to each other). The locking plate 43 is fixed to the support plate portion 41 such that the free end portion of the locking plate 43 (which is the end opposite from the end portion that is fixed to the support plate portion 41) is oriented to extend directly below the cutout portion 42.

The angle member 45 is fixed to an upper portion of the support plate portion 41 through the connecting member 44. The angle member 45 has a guide plate portion 46 extending along the transport direction T and along the vertical direction. The guide plate portion 46 is located such that, when it is in the raised position, at least a portion of it is located above (i.e. at a greater height than) the support height L for the transported object A (see FIG. 5). When in the raised position, the guide plate portions 46 of the pair of first movable guide rails 40 guide the transporting of a transported object A having a small width (referred to hereinafter as a "small-width transported object As"), with the guide plate portions' surfaces that face each other (see FIG. 6).

Each second movable guide rail 50 has a support plate portion 51, a connecting member 54 fixed to an upper portion of this support plate portion 51, and an L-shaped angle member 55. Slidable members 59 are fixed to a side surface of the connecting member 54. Each slidable member 59 is engaged with a corresponding raising-and-lowering movement guide 58 fixed to the side surface of the covering 23 of a second conveyor 20B and can slide up and down the guide 58 while engaged therewith. Each second movable guide rail 50 is raised and lowered while being guided by the raising-and-lowering movement guide 58 and the slidable member 59 that are engaged with each other.

A cutout portion 52 which opens downward is formed in a lower end edge of each support plate portion 51 (see FIG. 5). Each cutout portion 52 is a combination of a generally rectangular-shape cutout portion 52A which has a flat rectangular shape as seen along a direction normal to the support plate portion 41 and an U-shape cutout portion 52B which is formed in the central portion of the rectangular-shape cutout portion 52A and which has an inverted U-shape as seen along a direction normal to the support plate portion 41. In addition, a locking plate 53 is fixed to a bottom surface of the support plate portion 51 such that the locking plate 53 is located across from the cutout portion 52 (rectangular-shape cutout portion 52A in the present example). The locking plate 53 is a bent plate which is a piece of elongate flat thin material bent into a crank shape (i.e. bent to form a right angle at two longitudinally intermediate locations so that the two end pieces are parallel to each other). The locking plate 53 is fixed to the support plate portion 51 such that the free end portion of the locking plate 53 (which is the end opposite from the end portion that is fixed to the support plate portion 51) is oriented to extend directly below the cutout portion 52, and such that the locking plate 53 is oriented to extend in the direction opposite from the direction in which the locking plate 43 of the first movable guide rail 40 is oriented to extend.

The angle member 55 is fixed to an upper portion of the support plate portion 51 through the connecting member 54. The angle member 55 has a guide plate portion 56 extending along the transport direction T and along the vertical direction. The guide plate portion 56 is located such that, when it is in the raised position, at least a portion of it is located above (i.e. at a greater height than) the support height L for the transported object A (see FIG. 7). When in the raised position, the guide plate portions 56 of the pair of second movable guide rails 50 guide the transporting of a transported object A (referred to hereinafter as a "intermediate-width transported object Am") having a width that is greater than the width of a small-width transported object As and less than the width of a large-width transported object AL, with the guide plate portions' surfaces that face each other (see FIG. 8).

As shown in FIG. 4, the raising-and-lowering mechanism 60 has an actuator 61, a drive shaft 63 drivingly rotated (i.e., rotated to transmit force) by this actuator 61, and a plurality of cam members 65 fixed to the drive shaft 63 where the number of cam members is equal to the number (four in the present example) of the movable guide rails 4. Note that, although the actuator 61 rotates one drive shaft 63 in the present embodiment, the following description applies equally to the case in which there are two drive shafts that are rotated by the actuator 61 with one drive shaft 63 extending to the right from the speed-reduction-or-increasing drive 62 (described below) in FIG. 4 and the other drive shaft 63 extending to the left, for example, by treating the two drive shafts as one drive shaft 63. The actuator 61 may be an electric motor, for example. The actuator 61 is located in the central area (between the first conveyors 20A of the pair) along the lateral width direction W. The actuator is connected or coupled to the drive shaft 63 through a speed-reduction-or-increasing drive 62 (which is a mechanism for reducing or increasing rotational speed, and may be a reduction drive such as a reduction gear as in the present example). The drive shaft 63 is disposed such that it extends along the lateral width direction W from the speed-reduction-or-increasing drive 62 in each direction along the lateral width direction W, which is also the direction along which the plurality of movable guide rails 4 are spaced apart from each other.

The drive shaft 63 is formed by a plurality of shaft sections 64 with one shaft section located next to another, and with the divisions or connecting points between adjacent segments 64 being spaced apart from each other, along the lateral width direction W (which coincides with the direction along which the shaft 63 extends). Each of the portions of the drive shaft 63 that are on the respective sides of the speed-reduction-or-increasing drive 62 has, or is formed by, a plurality of shaft segments 64. In the present embodiment, the drive shaft 63 has, on each side of the speed-reduction-or-increasing drive 62, a first shaft segment 64A which extends from the speed-reduction-or-increasing drive 62, and a second shaft segment 64B connected to the outward end of the first shaft segment 64A for integral rotation therewith (see also FIG. 2). Each second shaft segment 64B is supported for rotation by bearings (not shown) fixed to lower portions of the coverings 23 of the corresponding first conveyor 20A and the corresponding second conveyor 20B.

Each cam member 65 has a cam plate 66 and a projection 67 connected to this cam plate 66. The cam plate 66 is generally formed in, for example, an egg or oval shape (see FIG. 5). The projection 67 is connected to a distal end portion (the top most portion or one of the two end portions of an oval that has a smaller radius of curvature) of the cam plate 66 such that the projection 67 projects from the cam plate 66 in one direction along (i.e., parallel to) the lateral width direction W. The projection 67 may include a roller rotatably coupled to the cam plate 66. Each projection 67 is placed either (a) between the support plate portion 41 and the locking plate 43 of the corresponding first movable guide rail 40 to engage the support plate portion 41 and the locking plate 43, or (b) between the support plate portion 51 and the locking plate 53 of the corresponding second movable guide rail 50 to engage the support plate portion 51 and the locking plate 53. As such, each movable guide rail 4 is configured to be capable of coming in contact with the corresponding projection 67 from both above and below.

Each of the plurality of cam members 65 is fixed to the drive shaft 63 at a location along the lateral width direction W that corresponds to the location of the corresponding one of the plurality of movable guide rails 4. Each cam member 65 of the present embodiment is fixed to the drive shaft 63 through a fastening element (not shown) that uses friction to secure the cam member 65 so that the position of each cam member 65 along the lateral width direction W with respect to the drive shaft 63 can be adjusted. Examples of a fastening element (not shown) that uses friction to secure the cam member 65 includes (a) an adjustable clamp (e.g. one for use on a rubber gas pipe) welded or otherwise securely fastened to the cam plate 66, and (b) a nut welded or otherwise securely fastened to the cam plate 66 at a location near a hole for the drive shaft 63 and a bolt that is in threading engagement with the nut and whose distal end can be in frictional contact with the drive shaft 63. The cam member 65 can slide freely on the drive shaft 63 along the lateral width direction W when the fastening element is loosened and is firmly fixed to the drive shaft 63 when the fastening element is tightened. By having a fastening element between each cam member 65 and the drive shaft 63, each of the plurality of cam members 65 can be easily fixed, by adjusting its position, at the location along the lateral width direction W that corresponds to the location of the corresponding one of the plurality of movable guide rails 4. In addition, this arrangement also facilitates adjustment of the attitude (or angular position) of each cam member 65, as described below.

Each of the plurality of cam members 65 is fixed to the drive shaft 63 in a predetermined attitude (i.e., at a predetermined angular position as seen along the axis of the shaft 63) for the corresponding one of the plurality of movable guide rails 4. The cam members 65 include first cam members 65A for engaging the first movable guide rails 40, and second cam members 65B for engaging the second movable guide rails 50. Two first cam members 65A, one for each of the first movable guide rails 40 of the pair, are provided. Two second cam members 65B, one for each of the second movable guide rails 50 of the pair, are provided as well.

The first cam members 65A of the pair are fixed to the drive shaft 63 in such an attitude that their engaging members (i.e., projections 67) which engage corresponding first movable guide rails 40 are at the same angular position as seen along the axis of the shaft 63. The second cam members 65B of the pair are fixed to the drive shaft 63 in such an attitude that their engaging members (i.e., projections 67) which engage corresponding second movable guide rails 50 are at the same angular position as seen along the axis of the shaft 63. The first cam members 65A and the second cam members 65B are fixed to the drive shaft 63 in such respective attitudes that the engaging member of each first cam member 65A is at an angular position that is different (more specifically, by 180°) from the angular position of the engaging member of each second cam member 65B.

Since the transport device 1 includes such a raising-and-lowering mechanism 60, when the actuator 61 drivingly rotates the drive shaft 63, each of the plurality of movable guide rails 4 is moved to change its height depending on the fixing attitude of corresponding one of the cam members 65, where the "fixing attitude" is the attitude (i.e., angular position) of the cam member 65 in which the cam member 65 is fixed to the drive shaft 63. The plurality of movable guide rails 4 can be individually raised and lowered at a timing for each guide rail 4, simply by drivingly rotating the drive shaft 63 common to the plurality of movable guide rails 4, with the single actuator 61.

The actuator 61 can change the rotation phase angle of the drive shaft 63 to, and between, a first phase angle P1, a second phase angle P2, and a third phase angle P3. Here, in the present embodiment, the third phase angle P3 is the rotation phase angle of the drive shaft 63 when the engaging member (i.e., the projection 67) of the first cam member 65A engaged with the first movable guide rail 40 and the engaging member (i.e., the projection 67) of the second cam member 65B engaged with the second movable guide rail 50 are at the same height (see FIG. 9). This third phase angle P3 is defined to be the reference phase angle (i.e., 0°). Then the rotation phase angle (+θ°) of the drive shaft 63 after it is rotated an angle θ° from the reference phase angle in one direction is the first phase angle P1 (see FIG. 5) whereas the rotation phase angle (−θ°) of the drive shaft 63 after it is rotated the angle θ° from the reference phase angle in the opposite direction is the second phase angle P2 (see FIG. 7). The actuator 61 can change the rotation phase angle of the drive shaft 63 between the first phase angle P1 and the third phase angle P3 and between the third phase angle P3 and the second phase angle P2. In addition, the changing of the phase angle between the first phase angle P1 and the second phase angle P2 can be performed by going through the third phase angle P3.

As shown in FIG. 5, when the drive shaft 63 is rotated to the first phase angle P1, the engaging member (i.e., the projection 67) of each first cam member 65A is raised by the amount that depends on the rotation angle (θ°) of the drive shaft 63. When this happens, the support plate portion 41 which is in contact with the projection 67 of the first cam member 65A from above is pushed up by the projection 67, which causes the entire first movable guide rail 40 to be raised to the raised position. Then each first movable guide rail 40 is in such a state or position that at least a portion (preferably at least the upper half) of the guide plate portion 46 of the angle member 45 projects above the support height L for a transported object A.

In contrast, the engaging member (i.e., the projection 67) of each second cam member 65B which has the 180-degree phase difference with the first cam member 65A is lowered by the amount that depends on the rotation angle (θ°) of the drive shaft 63 and that is the same amount as the amount by which the engaging member of each first cam member 65A is raised. When this happens, the locking plate 53 which is in contact with the projection 67 of the second cam member 65B from below is pushed down by the projection 67, which causes the entire second movable guide rail 50 to be lowered to the lowered position. At this time, the entire second movable guide rail 50 is located below the support height L for the transported object A. Note that, when the second movable guide rail 50 is lowered, the drive shaft 63 is accommodated in the U-shape cutout portion 52B formed in the support plate portion 51; thus, each second movable guide rail 50 can be lowered properly without the rail 50 coming into contact with the drive shaft 63.

As such, as shown in FIG. 6, when the drive shaft 63 is at the first phase angle P1, the pair of first movable guide rails 40 project upward above the support height L for the transported object A, and the entire second movable guide rails 50 of the pair are located below the support height L for the transported object A. When the transport device 1 transports a small-width transported object As, the actuator 61 may drivingly rotate the drive shaft 63 beforehand so that the drive shaft 63 is at the first phase angle P1. By so doing, the small-width transported object As is properly positioned along the lateral width direction W with ease by the pair of first movable guide rails 40 in the raised position, which properly guide the transporting of the small-width transported object As.

Figure 7:
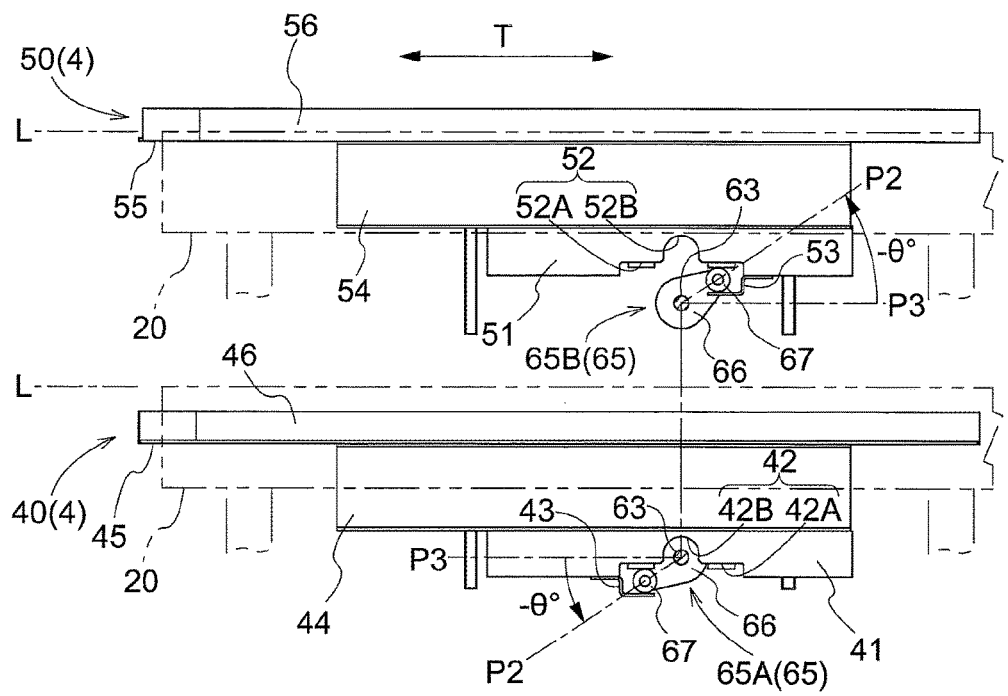
FIG. 7 is a side view showing the states of two movable guide rails when the drive shaft is at a second phase angle.

As shown in FIG. 7, when the drive shaft 63 is rotated to the second phase angle P2, the engaging member (i.e., the projection 67) of each first cam member 65A is lowered by the amount that depends on the rotation angle (−θ°) of the drive shaft 63. When this happens, the locking plate 43 which is in contact with the projection 67 of the first cam member 65A from below is pushed down by the projection 67, which causes the entire first movable guide rail 40 to be lowered to the lowered position. At this time, the entire first movable guide rail 40 is located below the support height L for the transported object A. Note that, when each first movable guide rail 50 is lowered, the drive shaft 63 is accommodated in the U-shape cutout portion 42B formed in the support plate portion 41; thus, each first movable guide rail 40 can be lowered properly without the rail 40 coming into contact with the drive shaft 63.

In contrast, the engaging member (i.e., the projection 67) of each second cam member 65B which has the 180-degree phase difference with the first cam member 65A is raised by the amount that depends on the rotation angle (−θ°) of the drive shaft 63 and that is the same amount as the amount by which the engaging member of each first cam member 65A is lowered. When this happens, the support plate portion 51 which is in contact with the projection 67 of the second cam member 65B from above is pushed up by the projection 67, which causes the entire second movable guide rail 50 to be raised to the raised position. At this time, each second movable guide rail 50 is in such a state that at least a portion (preferably at least the upper half) of the guide plate portion 56 of the angle member 55 projects above the support height L for a transported object A.

Figure 8:
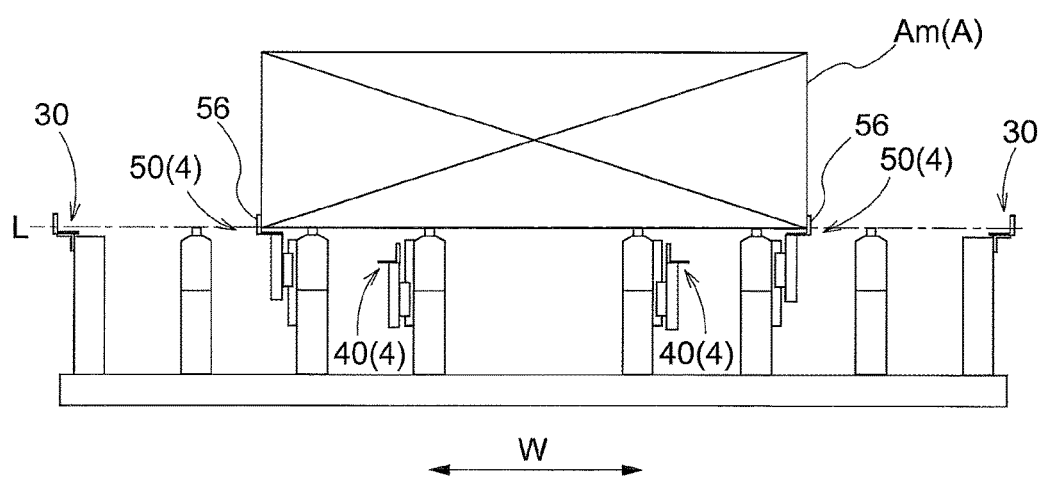
FIG. 8 is a front view of the transport device when the drive shaft is at the second phase angle.

As such, as shown in FIG. 8, when the drive shaft 63 is at the second phase angle P2, the pair of second movable guide rails 50 project upward above the support height L for the transported object A, and the entire first movable guide rails 40 of the pair are located below the support height L for the transported object A. When the transport device 1 transports an intermediate-width transported object Am, the actuator 61 may drivingly rotate the drive shaft 63 beforehand so that the drive shaft 63 is at the second phase angle P2. By so doing, the intermediate-width transported object Am is properly positioned along the lateral width direction W with ease by the pair of second movable guide rails 50 in the raised position, which properly guide the transporting of the intermediate-width transported object Am.

Figure 9:
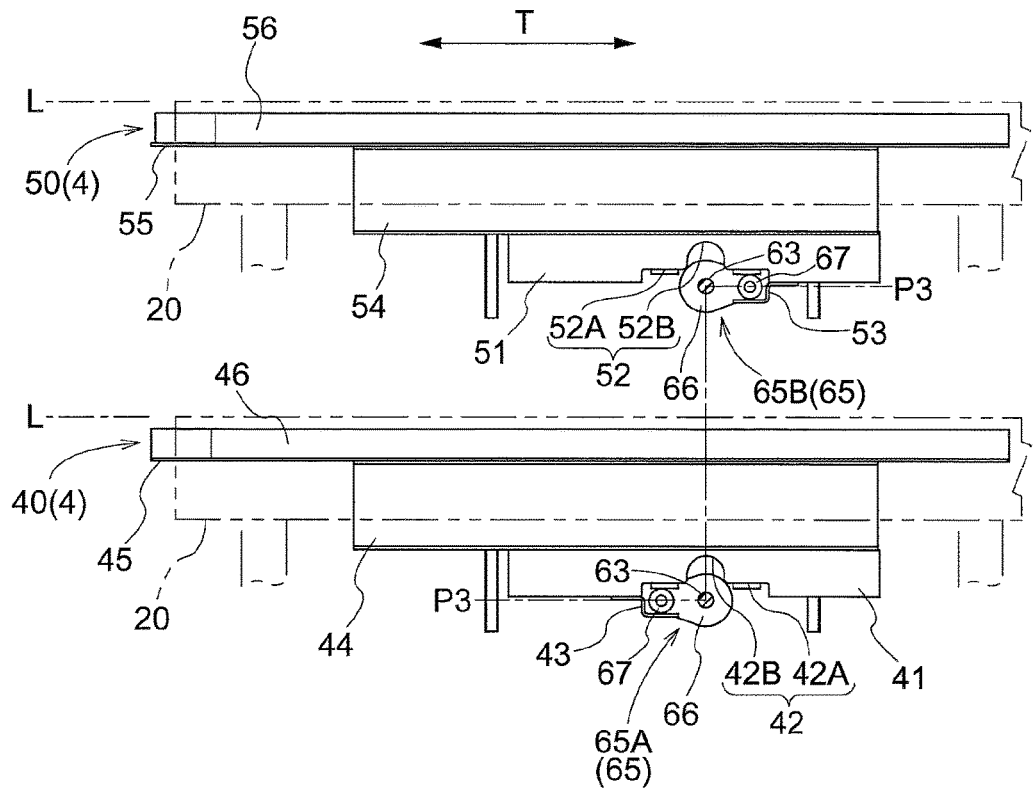
FIG. 9 is a side view showing the states of two movable guide rails when the drive shaft is at a first phase angle.

As shown in FIG. 9, when the drive shaft 63 is at the third phase angle P3, the engaging member (that is, projection 67) of each first cam member 65A and the engaging member (that is, projection 67) of each second cam member 65B are at the same height. The position of the engaging member of each first cam member 65A at this time is lower than its height when the drive shaft 63 is at the first phase angle P1 whereas the position of the engaging member of each second cam member 65B at this time is lower than its height when the drive shaft 63 is at the second phase angle P2. Each first movable guide rail 40 and each the second movable guide rail 50 are at an intermediate position between the raised position and the lowered position, in accordance with the position of the engaging member of the corresponding first cam member 65A and the engaging member of the corresponding second cam member 65B respectively. At this time, each first movable guide rail 40 in its entirety and each second movable guide rail 50 in its entirety are located below the support height L of a transported object A.

Figure 10:
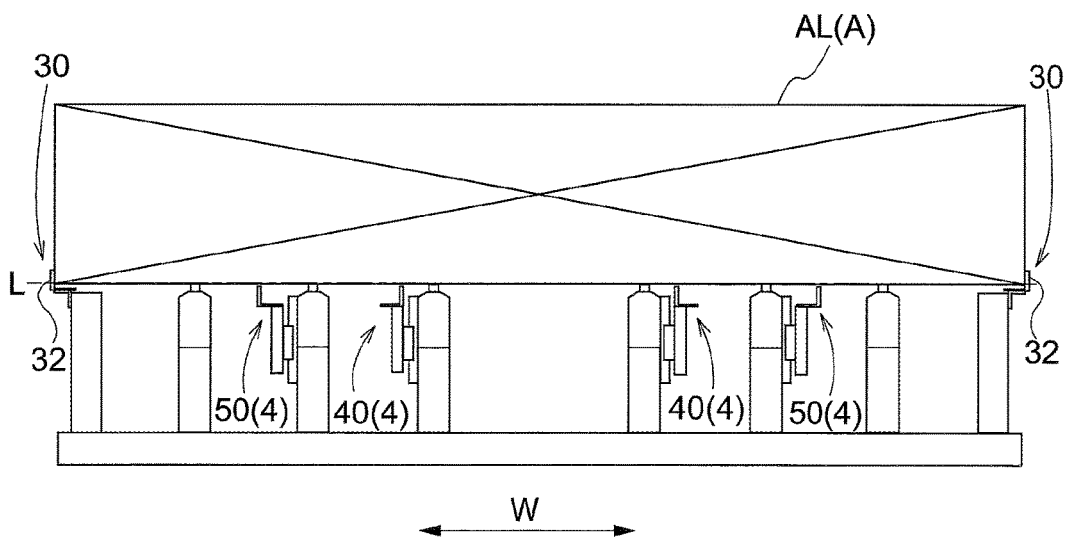
FIG. 10 is a front view of the transport device when the drive shaft is at the third phase angle.

As such, as shown in FIG. 10, when the drive shaft 63 is at the third phase angle P3, each of the pair of first movable guide rails 40 in its entirety and each of the pair of second movable guide rails 50 in its entirety are located below the support height L for the transported object A. When the transport device 1 transports a large-width transported object AL, the actuator 61 may drivingly rotate the drive shaft 63 beforehand so that the drive shaft 63 is at the third phase angle P3. By so doing, the large-width transported object AL is properly positioned along the lateral width direction W with ease by the pair of fixed guide rails 30, which properly guide the transporting of the large-width transported object AL.

As such, in the present embodiment, each of the plurality of movable guide rails 4 is configured to be moved to change its height depending on the fixing attitude of corresponding one of the cam members 65 when the actuator 61 drivingly rotates the drive shaft 63. The single actuator 61 is used to raise and lower the plurality of movable guide rails 4 so that there is only one actuator that is necessary. This helps reduce the size and cost of the transport device. Such a small transport device 1 is particularly advantageous when it is mounted on a carriage and used as a carriage-type transport device.

A raising-and-lowering-state detector 70 is provided in the transport device 1 of the present embodiment in order to detect a raising and lowering state of the plurality of movable guide rails 4. The raising-and-lowering-state detector 70 detects which of the raised position, the lowered position, and the intermediate position, one of the first movable guide rails 40 of the pair is at. In the present embodiment, because of the way the pair of first cam members 65A are fixed to the drive shaft 63, the two first movable guide rails 40 are raised and lowered in synchronization; thus, the positions of both of the first movable guide rails 40 of the pair can be determined based on the detection result from the raising-and-lowering-state detector 70. In addition, because of the way the first cam members 65A and the second cam members 65B are fixed to the drive shaft 63, the first movable guide rails 40 and the second movable guide rails 50 are raised and lowered in correlation with each other and in a seesaw or teeterboard manner in which, when the first movable guide rails 40 reach the raised position, the second movable guide rails 50 reach the lowered position, and vice versa. Thus, the positions of the second movable guide rails 50 of the pair can also be determined based on the detection result from the raising-and-lowering-state detector 70.

Figure 11:
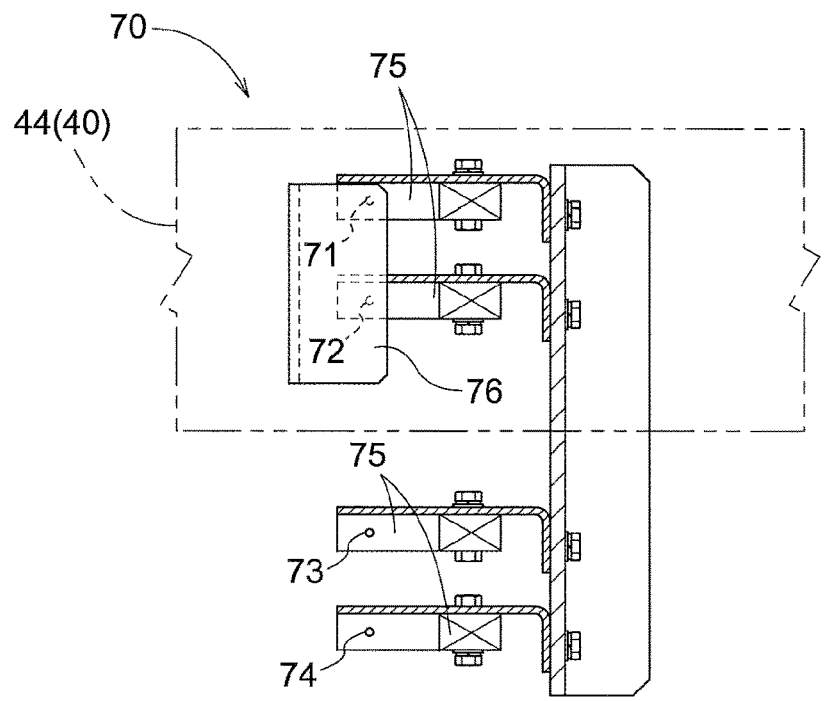
FIG. 11 shows a state of a raising-and-lowering-state detector when a first movable guide rail is in a raised position.

More specifically, as shown in FIG. 11, the raising-and-lowering-state detector 70 includes four sensors, namely, a first sensor 71, a second sensor 72, a third sensor 73, and a fourth sensor 74. These sensors may be transmission type photoelectric sensors, for example. The sensors 71-74 are located at mutually different heights, using a support bracket 75 that has a shape of a square bracket ("]" or a shape of the letter "U" with two right-angle corners) in plan or top-down view to fasten each of the sensors 71-74. Note that, the sensors will be referred to, in descending order of heights, as the first sensor 71, the second sensor 72, the third sensor 73, and the fourth sensor 74. The support brackets 75 holding or supporting respective sensors 71-74 are fixed, through a support member, to a side face (of the covering 23 of a second conveyor 20B) that faces the first movable guide rail 40.

Figure 12:
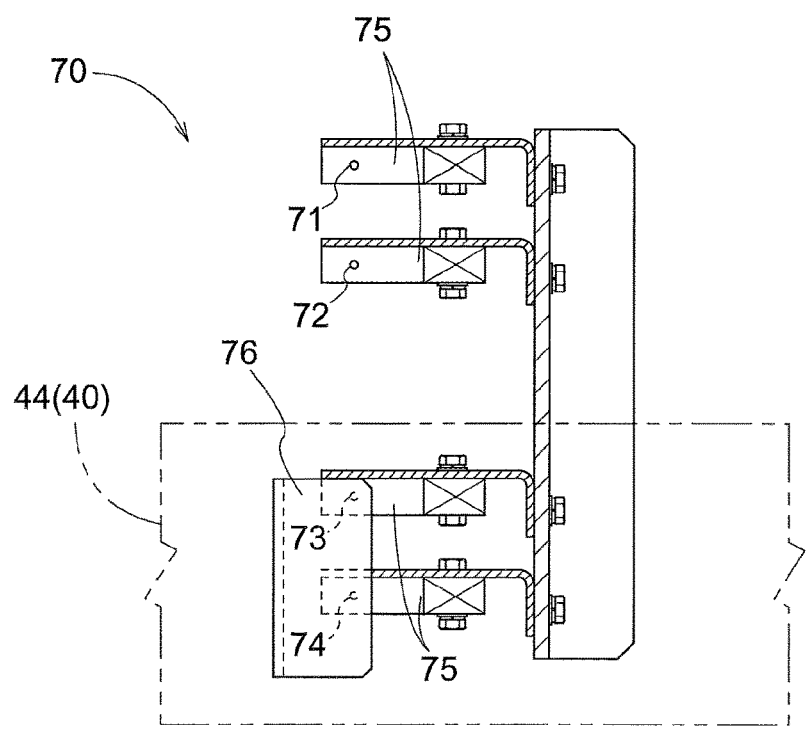
FIG. 12 shows a state of the raising-and-lowering-state detector when the first movable guide rail is in a lowered position.
Figure 13:
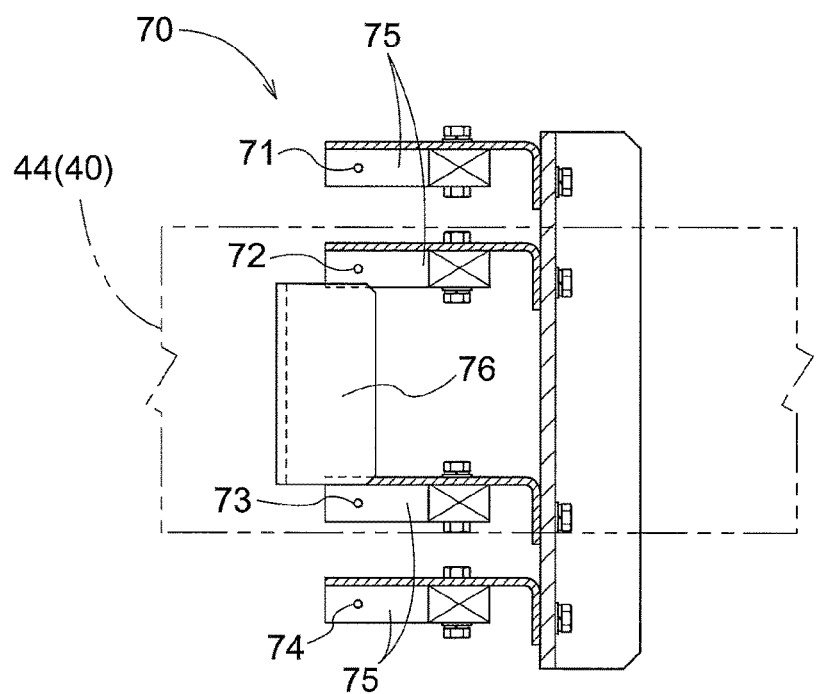
FIG. 13 shows the state of the raising-and-lowering-state detector when two movable guide rails are in an intermediate position.

A blocking plate 76 which can be inserted into the groove or the space between the two legs of the square-bracket-shaped support bracket 75 is fixed to the side surface (of the connecting member 44 of the first movable guide rail 40) that faces the second conveyor 20B. The blocking plate 76 is formed by bending a generally flat and thin member with a set vertical width into an L-shape. As shown in FIGS. 11 and 12, the vertical distance between the first sensor 71 and the second sensor 72 and the vertical distance between the third sensor 73 and the fourth sensor 74 are both set to be less than the vertical dimension of the blocking plate 76. On the other hand, the vertical distance between the second sensor 72 and the third sensor 73 is set to be greater than the vertical dimension of the blocking plate 76, as shown in FIG. 13. The vertical distance between the second sensor 72 and the third sensor 73 may be set to be slightly greater than the vertical dimension of the blocking plate 76 (for example, by between 3% and 25% of the vertical dimension of the blocking plate 76 or more preferably between approximately 5% and 10% of said vertical dimension).

When the drive shaft 63 is at the first phase angle P1, the first movable guide rail 40 in question is at the raised position. If the first movable guide rail 40 is indeed at the raised position at this time as shown in FIG. 11, then the blocking plate 76 fixed to the first movable guide rail 40 is so located to overlap with both the first sensor 71 and the second sensor 72 as seen along a direction normal to the side face of the connecting member 44 (i.e., so located to interrupt projected lights from the first sensor 71 and the second sensor 72, triggering both sensors 71 and 72). Therefore, based on the fact that both the first sensor 71 and the second sensor 72, which are the two upper sensors, are triggered, it can be determined that the pair of first movable guide rails 40 are actually in the raised position and also that the pair of second movable guide rails 50 are actually in the lowered position. It is preferable that a superordinate controller which controls the operation of the transport device 1 is configured to permit the transporting of a small-width transported object As, based on this affirmative determination.

When the drive shaft 63 is at the second phase angle P2, the first movable guide rail 40 in question is at the lowered position. If the first movable guide rail 40 is indeed at the lowered position at this time as shown in FIG. 12, then the blocking plate 76 is so located to overlap with both the third sensor 73 and the fourth sensor 72 as seen along the direction normal to the side face of the connecting member 44. Therefore, based on the fact that both the third sensor 73 and the fourth sensor 74, which are the two lower sensors, are triggered, it can be determined that the pair of first movable guide rails 40 are actually in the lowered position and also that the pair of second movable guide rails 50 are actually in the raised position. It is preferable that the superordinate controller is further configured to permit the transporting of an intermediate-width transported object Am, based on this affirmative determination.

In addition, when the drive shaft 63 is at the third phase angle P3, the first movable guide rail 40 in question is at the intermediate position. If the first movable guide rail 40 is indeed at the middle position between the raised position and the lowered position at this time as shown in FIG. 13, the blocking plate 76 would be located between the second sensor 72 and the third sensor 73 and so located to not overlap with any of the sensors 71-74, as seen along the direction normal to the side face of the connecting member 44 (i.e., so located to not interrupt any projected light from any of the sensors 71-74). Therefore, based on the fact that none of the sensors 71-74 are triggered, it can be determined that the pair of first movable guide rails 40 and the pair of second movable guide rails 50 are actually in the intermediate position. It is preferable that the superordinate controller is further configured to permit the transporting of a large-width transported object As, based on this negative determination.

In addition, if and when the first movable guide rails 40 and the second movable guide rails 50 end up being located away (or displaced) from the intermediate position by some distance in spite of an attempted control to locate the drive shaft 63 at the third phase angle P3, then the blocking plate 76 would be so located to overlap with the second sensor 72 and the third sensor 73 as seen along the direction normal to the side face of the connecting member 44. Therefore, based on the fact that either one of the second sensor 72 and the third sensor 73 is triggered, it can be determined that the first movable guide rails 40 and the second movable guide rails 50 are displaced from the intermediate position. It can be determined, for example, that either the first movable guide rails 40 or the second movable guide rails 50 is so located that a portion thereof is projected above the support height L for the transported object A. It is preferable that the superordinate controller is further configured to prohibit the transporting of a large-width transported object AL in such an event.

[Other Embodiments]

(1) In the embodiment described above, an example is described in which two pairs of movable guide rails 4 with the total of four movable guide rails 4 are provided. However, the invention is not limited to such an arrangement. A different number of the movable guide rails 4 may be provided as desired. That is, the number of the movable guide rails 4 may be two, or may be four or a greater even number. Alternatively, the number of the movable guide rails 4 may be three or a greater odd number. When the number of the movable guide rails 4 is large, the number of the shaft segments 64 may be increased to operate the increased number of movable guide rails 4.

(2) In the embodiment described above, an example is described in which each movable guide rail 4 is configured to come in contact with the corresponding cam member 65 (or more specifically, the projection 67) from above and below. However, the invention is not limited to such an arrangement. For example, the locking plates 43 and 53 do not have to be provided so that each movable guide rail 4 is configured to come in contact with the corresponding cam member 65 only from above. In this case, the projections 67 may not be provided to the cam members 65 so that each movable guide rail 4 is configured to come in contact with the cam plate 66 of the corresponding cam member 65 only from above.

(3) In the embodiment described above, an example is described in which the first cam members 65A and the second cam members 65B are fixed to the drive shaft 63 in such respective attitudes that the engaging member of each first cam member 65A is at an angular position that is different by 180° from the angular position of the engaging member of each second cam member 65B. However, the invention is not limited to such an arrangement. The respective attitudes in which the first cam members 65A and the second cam members 65B are fixed to the drive shaft 63 only need to be such that the engaging member of each first cam member 65A is at an angular position that is different from the angular position of the engaging member of each second cam member 65B. The first phase angle P1, the second phase angle P2, and the third phase angle P3 may be set depending on the fixing attitude of each cam member 65.

(4) In the embodiment described above, an example is described in which the actuator 61 which is a part of the raising-and-lowering mechanism 60 is an electric motor. However, the invention is not limited to such an arrangement. Other mechanism, such as a rotary actuator which operates, for example, with fluid pressure, such as air pressure, may also be used as the actuator 61.

(5) In the embodiment described above, an example is described in which the drive shaft 63 which is a part of the raising-and-lowering mechanism 60 consists of a plurality of shaft segments 64. However, the invention is not limited to such an arrangement. Each of the portions of the drive shaft 63 that extend along the lateral width direction W from the actuator 61 may be a single axial member. In addition, the actuator 61 may be located near, for example, one end portion along the lateral width direction W (e.g., between a third conveyor 30C and the corresponding fixed guide rails 30) and the drive shaft 63 may be a single piece axial member.

(6) In the embodiment described above, an example is described in which the raising-and-lowering-state detector 70 includes four sensors 71-74 spaced apart from each other by predetermined distances along the vertical direction as well as a blocking plate 76. However, the invention is not limited to such an arrangement. The specific arrangement or structure of the raising-and-lowering-state detector 70 may be of any desired design as long as it can detect, or allow determination of, which position (among a raised position, a lowered position, and an intermediate position) each of the plurality of movable guide rails 4 is at.

(7) In the embodiment described above, an example is described in which a chain conveyor is used as each conveyor 20. However, the invention is not limited to such an arrangement. For example a belt conveyor, or a roller conveyor, etc., may be used as each conveyor 20.

(8) In the embodiment described above, an example is described in which the transport device 1 is a carriage-type transport device on a railed track. However, the invention is not limited to such an arrangement. The technology in accordance with the present disclosure may be applied broadly to other types of transport devices such as a carriage that can travel without a fixed track, or a stationary transport device.

(9) Any arrangement and feature disclosed in any one embodiment described above (including the main embodiment and any alternative embodiment described above, which is true of any embodiment mentioned below) may be used in combination with any arrangement and feature disclosed in another embodiment, unless such combination gives rise to a contradiction. Regarding any arrangement, the embodiments disclosed in the present specification are presented for the sole purpose of illustrating examples with respect to all aspects of the embodiments. It is possible to make suitable changes and modifications without departing from the spirit of the present disclosure.

[Summary of Embodiments]

To briefly summarize the description provided above, the transport device related to the present disclosure preferably includes, but not limited to, each of the following arrangement.

A transport device of the present disclosure comprises: a conveyor configured to transport a transported object along a transport direction; a plurality of movable guide rails each of which is provided at a corresponding one of a plurality of locations along a lateral width direction which is perpendicular to the transport direction, such that each of the plurality of movable guide rails extends along the transport direction; a drive shaft disposed to extend along the lateral width direction; an actuator configured to drivingly rotate the drive shaft; wherein a plurality of cam members are fixed to the drive shaft, in respective fixing attitudes, such that each of the plurality of cam members is provided for corresponding one of the plurality of movable guide rails, wherein each of the plurality of movable guide rails is configured to be moved to change a height thereof depending on a fixing attitude of corresponding one of the cam members as the actuator drivingly rotates the drive shaft.

With such an arrangement, when the actuator drivingly rotates the drive shaft to which the plurality of cam members are fixed, each of the plurality of movable guide rails is moved to change its height depending on a fixing attitude of corresponding one of the cam members. Because a single actuator is used for changing the heights of the plurality of movable guide rails, only one actuator is required, which makes it possible to reduce the size and cost of the transport device. Even when the number of movable guide rails installed is increased to more than two in particular, such situation may be dealt with by increasing the number of the cam members fixed to the drive shaft, without having to increase the number of actuators. Thus, transporting of transported objects of various sizes can be properly guided while making it possible to reduce the size and cost of the transport device.

In an embodiment, each of the plurality of cam members preferably has a cam plate and a projection which projects along the lateral width direction from a distal end portion of the cam plate, wherein each of the plurality of movable guide rails is preferably configured to be capable of coming in contact with corresponding one of the projections from above and below.

With such an arrangement, since each movable guide rail comes in contact with the projection provided in the distal end portion of the cam plate of the corresponding cam member, not only the gravitational force but also the actuating force of the actuator can be used to lower the movable guide rail. Therefore, the movable guide rails can be raised and lowered reliably.

In an embodiment, a raising-and-lowering-state detector configured to detect raising and lowering states of the plurality of movable guide rails is preferably provided.

With such an arrangement, it can be detected if each of the plurality of movable guide rails is at an expected position (raised position, lowered position, or any other position as required). The presence of any abnormal condition can be determined easily based on the detection result.

In an embodiment, the drive shaft preferably includes a plurality of shaft segments with one shaft segment located next to another along the lateral width direction.

With such an arrangement, the number of, and the distances between, the movable guide rails in the lateral width direction can be adjusted easily depending on the number of the shaft segments that are connected together so as to be rotated in synchronization.

In an embodiment, each of the plurality of cam members is preferably so configured that a position thereof on the drive shaft can be adjusted.

With such an arrangement, the location of each movable guide rail along the lateral width direction can be adjusted easily depending on the location along the lateral width direction at which the corresponding cam member is fixed to the drive shaft.

In an embodiment, a pair of fixed guide rails are preferably further provided, the pair of fixed guide rails extending along the transport direction so that one and the other of the pair of fixed guide rails are located on one side and the other side respectively, in the lateral width direction, with respect to the plurality of movable guide rails, wherein the plurality of movable guide rails preferably include a pair of first movable guide rails configured to be moved to change heights thereof in synchronization with each other, and a pair of second movable guide rails which are so located that one and the other of the pair of second movable guide rails are located on one side and the other side respectively, in the lateral width direction, with respect to the pair of first movable guide rails, and which are configured to be moved to change heights thereof in synchronization with each other, and wherein the actuator is preferably configured to change a rotation phase angle of the drive shaft to: a first phase angle at which the pair of first movable guide rails project above a support height of a transported object being transported by the conveyor and entireties of the pair of second movable guide rails are located below the support height; a second phase angle at which the pair of second movable guide rails project above the support height and entireties of the pair of first movable guide rails are located below the support height; and a third phase angle at which the entireties of the pair of second movable guide rails and the entireties of the pair of first movable guide rails are located below the support height.

With such an arrangement, because the actuator can change the rotation phase angle of the drive shaft to the first phase angle, the second phase angle, and the third phase angle, the width for guiding by the fixed guide rails or by the plurality of movable guide rails can be selected from three or more different widths. Thus, transport of transported objects of three or more different sizes can be guided properly while making it possible to reduce the size and cost of the transport device.

In an embodiment, a first cam member which is one of the plurality of cam members that engages corresponding one of the pair of first movable guide rails and a second cam member which is one of the plurality of cam members that engages corresponding one of the pair of second movable guide rails are preferably fixed to the drive shaft in respective attitudes such that an angular position of an engaging member of the first cam member is different from an angular position of an engaging member of the second cam member, wherein the third phase angle is preferably the rotation phase angle of the drive shaft when the engaging member of the first cam member and the engaging member of the second cam member are at a same height, and wherein the first phase angle is preferably attained by rotating the drive shaft an angle $\theta°$ in one direction from the third phase angle whereas the second phase angle is preferably attained by rotating the drive shaft the angle $\theta°$ in a direction opposite from the one direction from the third phase angle.

With such an arrangement, with the reference angle defined to be the rotation phase angle (the third phase angle) of the drive shaft when the engaging member of the first cam member and the engaging member of the second cam member are at a same height, the rotation phase angle can be easily changed to the first phase angle and the second phase angle simply by rotating the drive shaft the angle $\pm\theta°$. By rotating the drive shaft an angle between $-\theta°$ and $+\theta°$, the width for guiding by the fixed guide rails or by the plurality of movable guide rails can be selected from three or more different widths.

It is considered to be sufficient for the transport device in accordance with the present disclosure to perform at least one of the results or effects described above.

What is claimed is:

1. A transport device, comprising:
a conveyor configured to transport a transported object along a transport direction;
a plurality of movable guide rails each of which is provided at a corresponding one of a plurality of locations along a lateral width direction which is perpendicular to the transport direction, such that each of the plurality of movable guide rails extends along the transport direction;
a pair of fixed guide rails extending along the transport direction so that one and the other of the pair of fixed guide rails are located on one side and the other side respectively, in the lateral width direction, with respect to the plurality of movable guide rails,
a drive shaft disposed to extend along the lateral width direction;
an actuator configured to drivingly rotate the drive shaft, wherein a plurality of cam members are fixed to the drive shaft, in respective fixing attitudes, such that each of the plurality of cam members is provided for a corresponding one of the plurality of movable guide rails;
wherein each of the plurality of movable guide rails is configured to be moved to change a height thereof depending on a fixing attitude of a corresponding one of the cam members as the actuator drivingly rotates the drive shaft;
wherein the plurality of movable guide rails include a pair of first movable guide rails configured to be moved to change heights thereof in synchronization with each other, and a pair of second movable guide rails which are so located that one and the other of the pair of second movable guide rails are located on one side and the other side respectively, in the lateral width direction, with respect to the pair of first movable guide rails, and which are configured to be moved to change heights thereof in synchronization with each other, and
wherein the actuator is configured to change a rotation phase angle of the drive shaft to:
a first phase angle at which the pair of first movable guide rails project above a support height of a transported object being transported by the conveyor and entireties of the pair of second movable guide rails are located below the support height;
a second phase angle at which the pair of second movable guide rails project above the support height and entireties of the pair of first movable guide rails are located below the support height; and
a third phase angle at which the entireties of the pair of second movable guide rails and the entireties of the pair of first movable guide rails are located below the support height.

2. The transport device as defined in claim 1, wherein a first cam member which is one of the plurality of cam members that engages a corresponding one of the pair of first movable guide rails and a second cam member which is one of the plurality of cam members that engages a corresponding one of the pair of second movable guide rails are fixed to the drive shaft in respective attitudes such that an angular position of an engaging member of the first cam member is different from an angular position of an engaging member of the second cam member, and wherein the third phase angle is the rotation phase angle of the drive shaft when the engaging member of the first cam member and the engaging member of the second cam member are at a same height, and
wherein the first phase angle is attained by rotating the drive shaft an angle $\theta°$ in one direction from the third phase angle whereas the second phase angle is attained by rotating the drive shaft the angle $\theta°$ in a direction opposite from the one direction from the third phase angle.

3. The transport device as defined in claim 1, wherein each of the plurality of cam members has a cam plate and a projection which projects along the lateral width direction from a distal end portion of the cam plate, and wherein each of the plurality of movable guide rails is configured to be capable of coming in contact with corresponding one of the projections from above and below.

4. The transport device as defined in claim 1, further comprising: a raising-and-lowering-state detector configured to detect raising and lowering states of the plurality of movable guide rails.

5. The transport device as defined in claim 1, wherein the drive shaft includes a plurality of shaft segments with one shaft segment located next to another along the lateral width direction.

6. The transport device as defined in claim 1, wherein each of the plurality of cam members is so configured that a position thereof on the drive shaft can be adjusted.

7. A transport device comprising:
a conveyor configured to transport a transported object along a transport direction;
a plurality of movable guide rails each of which is provided at a corresponding one of a plurality of locations along a lateral width direction which is perpendicular to the transport direction, such that each of the plurality of movable guide rails extends along the transport direction;
a drive shaft disposed to extend along the lateral width direction;
an actuator configured to drivingly rotate the drive shaft, wherein a plurality of cam members are fixed to the drive shaft, in respective fixing attitudes, such that each of the plurality of cam members is provided for corresponding one of the plurality of movable guide rails;
wherein each of the plurality of movable guide rails is configured to be moved to change a height thereof depending on a fixing attitude of a corresponding one of the cam members as the actuator drivingly rotates the drive shaft;
wherein the plurality of movable guide rails include a pair of first movable guide rails configured to be moved to change heights thereof in synchronization with each other, and a pair of second movable guide rails which are so located that one and the other of the pair of second movable guide rails are located on one side and the other side respectively, in the lateral width direction, with respect to the pair of first movable guide rails, and which are configured to be moved to change heights thereof in synchronization with each other, and
wherein the actuator is configured to change a rotation phase angle of the drive shaft to:
a first phase angle at which the pair of first movable guide rails project above a support height of a transported object being transported by the conveyor and entireties of the pair of second movable guide rails are located below the support height;

a second phase angle at which the pair of second movable guide rails project above the support height and entireties of the pair of first movable guide rails are located below the support height; and a third phase angle at which the entireties of the pair of second movable guide rails and the entireties of the pair of first movable guide rails are located below the support height.

8. The transport device as defined in claim 7, wherein each of the plurality of cam members has a cam plate and a projection which projects along the lateral width direction from a distal end portion of the cam plate, and wherein each of the plurality of movable guide rails is configured to be capable of coming in contact with corresponding one of the projections from above and below.

9. The transport device as defined in claim 7, further comprising: a raising-and-lowering-state detector configured to detect raising and lowering states of the plurality of movable guide rails.

10. The transport device as defined in claim 7, wherein the drive shaft includes a plurality of shaft segments with one shaft segment located next to another along the lateral width direction.

11. The transport device as defined in claim 7, wherein each of the plurality of cam members is so configured that a position thereof on the drive shaft can be adjusted.

* * * * *